United States Patent [19]
Watson

[11] Patent Number: 5,352,433
[45] Date of Patent: Oct. 4, 1994

[54] AN OXYGEN ENHANCED SPLIT FEEDSTREAM SULFUR RECOVERY PROCESS

[75] Inventor: Richard W. Watson, Iikley, England

[73] Assignee: The BOC Group plc, Windlesham, United Kingdom

[21] Appl. No.: 20,624

[22] Filed: Mar. 2, 1987

[30] Foreign Application Priority Data

Mar. 7, 1986 [GB] United Kingdom ............... 8605649
Jan. 30, 1987 [GB] United Kingdom ............... 8702132

[51] Int. Cl.$^5$ ............................................ C01B 17/04
[52] U.S. Cl. ............................................... 423/574.1
[58] Field of Search ................. 423/574 R, 574.1; 422/172

[56] References Cited

U.S. PATENT DOCUMENTS

| | | | |
|---|---|---|---|
| 2,650,154 | 8/1953 | Anderson | 423/574 R |
| 2,945,748 | 7/1960 | Magill | 423/574 R |
| 3,331,733 | 7/1967 | Venemark | 453/182 |
| 3,407,040 | 10/1968 | Kunkel | 423/574 R |
| 3,617,221 | 11/1971 | Egan et al. | 431/6 |
| 4,097,585 | 6/1978 | Fischer | 423/574 R |
| 4,552,747 | 11/1985 | Goar | 423/574 R |
| 4,632,818 | 12/1986 | Chen et al. | 423/574 R |
| 4,780,305 | 10/1988 | Steppe | 423/574 R |

FOREIGN PATENT DOCUMENTS

| | | | |
|---|---|---|---|
| 1181992 | 9/1985 | U.S.S.R. | 423/574 R |
| 2117749 | 10/1983 | United Kingdom . | |

OTHER PUBLICATIONS

"How a Computer Can Optimize Sulfur-Plant Design Operations," Opokar et al. Oil and Gas Journal, May 2, 1966, pp. 86-89.

*Primary Examiner*—Jeffrey E. Russel
*Attorney, Agent, or Firm*—David M. Rosenblum; Larry R. Cassett

[57] ABSTRACT

A hydrogen sulphide containing feed gas stream (typically including at least 70% by volume of hydrogen sulphide) is divided into a minor stream and a major stream. The minor stream is burnt in a first combustion region to form sulphur dioxide and water vapor. The resulting gas mixture is cooled in a heat exchanger and is employed in a second combustion region in which a portion of the hydrogen sulphide content of the major stream is burnt to form sulphur dioxide and water vapor. Reaction between the sulphur dioxide and remaining hydrogen sulphide takes place in a thermal reaction region to form sulphur vapor and water vapor. The proportions of sulphur burnt in the respective combustion regions and are chosen such that about one-third of the total hydrogen sulphide content of the feed gas stream is burnt to sulphur dioxide in these regions. Subsequent reaction between hydrogen sulpide and sulphur dioxide typically takes place in one or more catalytic reaction regions resulting with sulphur vapor being extracted in sulphur condensers. By using substantially pure oxygen to support combustion in the second combustion region, a relatively large flow rate of feed gas mixture may be handled in a plant of given size.

8 Claims, 2 Drawing Sheets

AN OXYGEN ENHANCED SPLIT FEEDSTREAM SULFUR RECOVERY PROCESS

BACKGROUND OF THE INVENTION

This invention relates to the treatment of gas streams. In particular, it relates to the treatment of a gas stream comprising hydrogen sulphide.

Gas streams comprising hydrogen sulphide are typically produced as waste products or by-products from many industrial processes. For example, acid gas streams comprising carbon dioxide and hydrogen sulphide are typically produced during oil refinery operations in which sulphur is removed from crude oil. It is necessary to treat such hydrogen sulphide-containing streams before discharging them to the atmosphere so as to reduce or remove altogether their content of sulphur-containing gases. One well known, widely practised process for treating a gas stream comprising hydrogen sulphide is the Claus process. This process is based on the reaction between hydrogen sulphide and sulphur dioxide to form sulphur vapour and water vapour in accordance with the equation.

$$SO_2 + 2H_2S = 2H_2O + 3S$$

Sulphur exists in the vapour phase in a number of different molecular species such as $S_2$, $S_6$ and $S_8$ according to the temperature.

The first stage of the Claus process is to burn approximately a third of the hydrogen sulphide in the incoming gas stream to form sulphur dioxide and water vapour in accordance with the equation:

$$2H_2S + 3O_2 = 2H_2O + 2SO_2$$

This combustion reaction takes place in a suitable furnace and normally air is used as the source of oxygen for the purposes of combustion. The furnace is designed such that reaction between the sulphur dioxide and hydrogen sulphide can start in the combustion zone and then continue downstream of the combustion zone. It is however a feature of the Claus reaction that at the temperature that is created by the combustion of hydrogen sulphide, it is not possible to convert more than about 75% of the remaining hydrogen sulphide to sulphur by reaction with sulphur dioxide, and typically between 50 to 70% of the hydrogen sulphide is so converted. It is however possible to achieve a higher percentage conversion in the presence of a catalyst at a reaction temperature in the order of 200° to 350° C. by reacting the remaining hydrogen sulphide and sulphur dioxide. (At such "catalytic" temperatures, the lower the temperature the higher is the percentage conversion that is achieved). Accordingly, after the gases pass out of the so-called thermal region of the furnace they are cooled to a temperature at which the sulphur that is formed in the furnace condenses. The sulphur is thus recovered. The gases are then reheated to a temperature suitable for the performance of a catalysed reaction between hydrogen sulphide and sulphur dioxide, such temperature typically being in the order of 200° C. A catalytic reaction is then carried out and typically about 60% of the remaining hydrogen sulphide is converted to sulphur. Nonetheless, it is still not possible to achieve 100% conversion as in practice conversions of more than 99.5% can be achieved only at a temperature at which the sulphur vapour condenses and thereby substantially reduces the effectiveness of the catalyst. It is therefore typical to perform the catalytic oxidation of hydrogen sulphide with sulphur dioxide in more than one stage with first condensation of sulphur vapour and then re-heating of the hydrogen sulphide bearing gas stream being carried out between each stage.

Various means may be employed to effect reheating of the gases prior to each catalytic stage. For example, a small part of the feed gas mixture can be diverted from upstream of the furnace and burnt in in-line burners completely to sulphur dioxide, there being typically one such burner upstream of each catalytic reactor. The hot, sulphur dioxide-containing gases are then mixed with the main gas stream upstream of each respective catalytic reactor so as to effect reheating. Alternatively, a part of the main gas stream can be taken from, say, a waste heat boiler used to cool the main gas stream leaving the furnace and used in the same manner as the gas from the in-line burners. Another alternative is to employ indirect heat exchange with, for example steam to effect reheating. Typically, after two or three such stages, sulphur formed in the most downstream stage is condensed out of the gas stream which is then passed to a tail gas clean-up process of a known kind for handling relatively dilute hydrogen sulphide streams (for example the Scot, Beavon or Stretford process) or which is then incinerated.

Many variations on this basic Claus process are possible. Some of these alterations are summarised in the paper "Sulfur Costs vary with Process Selection" by H. Fischer, Hydrocarbon Processing, March 1979, pp125 to 129.

Recently, there has been a trend towards using crude oils of relatively high sulphur contents and also a trend towards stricter environmental standards so far as the discharge to the atmosphere of sulphur-containing gases is concerned, thus requiring an increased number of hydrogen sulphide bearing streams to be treated and hence more treatment capacity for hydrogen sulphide containing gases. For example, where possible, it is desirable to increase the rate at which an exising Claus plant is able to produce sulphur. In practice, the ability of such plants to handle an increased throughput of hydrogen sulphide containing gas is limited. It has been realised that in order to supply the necessary oxygen for combustion, approximately 14 volumes of air are required for each six volumes of hydrogen sulphide in the gas mixture. It has been proposed in for example a paper entitled "Oxygen Use in Claus Sulphur Plants" by M. R. Gray and W. Y. Svrcek, 1981 Gas Conditioning Conference, Oklahoma, 1981 and in a paper entitled "Modifications Jump Sulphur Recovery Plant Capacity", Oil and Gas Journal, Aug. 20, 1984, pp108 to 112, that the capacity of existing Claus processes can be increased by substituting some commercially pure oxygen for air and thereby reducing the proportion of nitrogen in the gas mixture that flows through the process. In practice, however, in many plants, the amount of uprating that can be achieved by this method is limited as there is a tendency for the reduced volume of nitrogen to lead to higher exit temperatures from the furnace that cannot be withstood by the waste heat boiler or heat exchanger associated with the furnace or by the refractory lining of the furnace. Indeed, the more concentrated (in hydrogen sulphide) the gas stream, the less is the possibility for achieving any significant uprating, such possibility often becoming particularly limited for feed gas streams including 80% by volume or more of hydrogen sulphide. Another proposal for using pure oxygen in the Claus process is set out in U.S. Pat. No. 3,681,024 and its corresponding Canadian patent specification 854094. These patent specifications disclose burning one third of a hydrogen sulphide stream with oxygen of about 95% purity. Plant effluent from a one or two catalytic reactor unit is sent to a water scrubber to reduce the water content of the effluent, and a sufficient amount of the scrubber off-gas is recycled to dilute the oxygen feed so that the furnace temperature is essentially equivalent to that obtained in operation with air.

This process is stated to have the advantage of enabling plant size to be reduced. However, existing plants constructed with the intention of using air to support the combustion of the hydrogen sulphide are not readily convertible to perform the process described in U.S. Pat. No. 3,681,024 and this process has not found commercial layout. Moreover, the practice of recycling to the thermal reaction zone a gas mixture that has passed therethrough places a limitation on the amount by which the size of the furnace defining the thermal reaction zone can be reduced, particularly if the incoming hydrogen sulphide stream contains more than, say, 50% by volume of hydrogen sulphide. U.S. Pat. Nos. 3,331,733 and 4,552,747 are other examples of proposals in which gas is recirculated in order to moderate the temperature in the thermal reactor.

THE INVENTION

It is an aim of the present invention to provide an improved method and apparatus for recovering sulphur from a gas stream consisting of hydrogen sulphide or containing a relatively high proportion of hydrogen sulphide which are capable of minimising the volumes of "ballast" gas such as nitrogen that flow through the sulphur recovery process and which do not of necessity rely on recycling effluent gas to the inlet of the furnace.

According to the present invention there is provided a method of recovering sulphur from a feed gas stream comprising hydrogen sulphide, comprising dividing the feed gas stream into a major stream and a minor stream, burning in a first combustion region at least 50% of the hydrogen sulphide content of the minor stream to form sulphur dioxide and water vapour, and then cooling the minor stream, burning in a second combustion region less than one third of the hydrogen sulphide content of the major stream to form sulphur dioxide and water vapour, supporting the combustion of hydrogen sulphide in the major stream by supplying oxygen-rich gas (as hereinafter defined) to the second combustion region, reacting hydrogen sulphide with the thus-formed sulphur dioxide in a thermal reaction region associated with said second combustion region to form sulphur vapour and water vapour, extracting such sulphur vapour from the resulting gas mixture, and reacting the residual hydrogen sulphide in the gas mixture with residual sulphur dioxide to form further sulphur vapour and water vapour, and then extracting the further sulphur vapour, wherein the cooled minor stream is introduced into the second combustion region or the thermal region associated therewith (or both), and about one third of the total hydrogen sulphide content of the minor and major streams is burnt to form sulphur dioxide and water vapour.

Preferably, substantially all the hydrogen sulphide content of the minor stream is burnt to form sulphur dioxide and water vapour.

The invention also provides apparatus for recovering sulphur from a feed gas stream comprising hydrogen sulphide, including a first conduit for receiving a major portion of said feed gas stream; a second conduit for receiving a minor portion of said feed gas stream; a first combustion region having at least one first burner associated therewith for burning at least 50% of the hydrogen sulphide content of the minor stream to form sulphur dioxide and water vapour, said burner having an inlet communicating with said second conduit, and said first combustion region having an outlet communicating with an inlet of a heat exchange means for cooling gas mixture from said first combustion region; a second combustion region having at least one second burner associated therewith for burning hydrogen sulphide to form water vapour and sulphur dioxide, said at least one second burner having an inlet in communication with said first conduit and an inlet communicating with a source of oxygen-rich gas (as hereinafter defined); a thermal reaction region in which, in operation, sulphur dioxide reacts with hydrogen sulphide to form sulphur vapour and water vapour, said thermal reaction region communicating with an outlet from said second combustion region; a condenser, downstream of said thermal reaction region, for extracting sulphur vapour from gas mixture exiting said thermal reaction region; at least one further reaction region downstream of said condenser, for conducting further reaction between hydrogen sulphide and sulphur dioxide to form further sulphur vapour and water vapour; a further condenser for extracting said further sulphur vapour, and means for introducing the cooled gas mixture exiting said heat exchange means into one or both of the second combustion region and said thermal reaction region, whereby, in operation, about one-third of the total hydrogen sulphide content of the said major and minor portions is able to be burnt to form sulphur dioxide and water vapour.

By the term "oxygen-rich gas" as used herein, is meant a gaseous mixture containing at least 80% by volume of molecular oxygen the oxygen-rich gas is preferably substantially pure oxygen. Alternatively, it may for example be oxygen-enriched air. By appropriately choosing the relative sizes of the minor and major streams, it is possible to ensure that an excessive temperature is not generated in the second combustion region even in the event that the oxygen-rich gas is pure oxygen and the gas comprising hydrogen sulphide is relatively rich in hydrogen sulphide, that is contains more than 50% by volume of hydrogen sulphide (and typically more than 60% by volume of hydrogen sulphide), without the need to introduce any other fluid into the second combustion region than the cooled minor stream and the oxygen-rich gas. Accordingly, in comparison with a conventional Claus process in which about one-third of the hydrogen sulphide stream is burnt to form sulphur dioxide in a single furnace, and air is employed to support combustion of the hydrogen sulphide, a relatively greater throughput of hydrogen sulphide may be achieved in the method according to the invention for a given size of furnace (incorporating the second combustion region and its associated thermal reaction region).

Typically when stoichiometric or near stoichiometric combustion takes place in the first combustion region up to 10% of the feed gas stream is employed to form the minor stream, and the balance of the feed gas stream to form the major stream.

Air or another gaseous mixture including molecular oxygen may be used to support the combustion of the minor stream. It is desirable to prevent the formation of sulphur trioxide in the first combustion region. Accordingly, the amount of molecular oxygen supplied to the first combustion region is preferably in the range 90 to 100% of that necessary for the complete combustion of the hydrogen sulphide content of the minor stream. It is also preferred that the gas exiting the first combustion region is, downstream of where it is cooled, introduced into the hot zone of the flame or one or the flames in the second combustion region, whereby any traces of sulphur trioxide present in the gas may be destroyed.

Typically, in the event that air, oxygen-enriched air or pure oxygen is used to support combustion in the first combustion region, there may need to be additional cooling provided for such region so as to control the temperature at the inlet to heat exchange means downstream of the first combustion region. Such cooling may be provided by introducing a moderator or quenchant into the first combustion region. The moderator or quenchant may for example be selected from steam, liquid water, nitrogen and carbon dioxide. If desired, the burner or burners employed in the first combustion means may each be provided with a jacket for the circulation of coolant, such as water. The use of such cooling jacket or jackets may be as an alternative or in addition to the use of a moderator.

All the cooled minor stream is typically introduced directly into the second combustion region. Alternatively, a small portion or portions of this stream may be employed to provide reheat intermediate a sulphur condenser and a catalytic reaction region. Another alternative, which is preferred if pure oxygen or oxygen-enriched air is used to support combustion, is to return a portion of the cooled minor stream to the first combustion region as the moderator. In this event, preferably from 8 to 15% by volume of the feed gas stream is taken as the minor stream.

The method according to the invention may be performed on a plant built to custom for this purpose. It is however also possible to perform the method according to the invention on an existing plant for performing the Claus process with a need only for relatively minor modifications to the plant. Thus, an existing Claus furnace can be employed to provide the second combustion region and its associated thermal region in the method according to the invention and in the event that water is used as a moderator in the first combustion region, a relatively small furnace, defining the first combustion region, and a relatively small heat exchanger can be retro-fitted to the Claus furnace. This retro-fitting makes it possible to increase substantially the amount of sulphur produced per unit time in an existing plant without loss of conversion efficiency. If the moderator is recycled gas, then an enhanced uprating of the Claus furnace is made possible, but a larger first combustion region will be required.

BRIEF DESCRIPTION OF THE DRAWINGS

The method according to the present invention will now be described by way of example with reference to the accompanying drawings, of which.

DETAILED DESCRIPTION OF THE INVENTION

Figure 1:
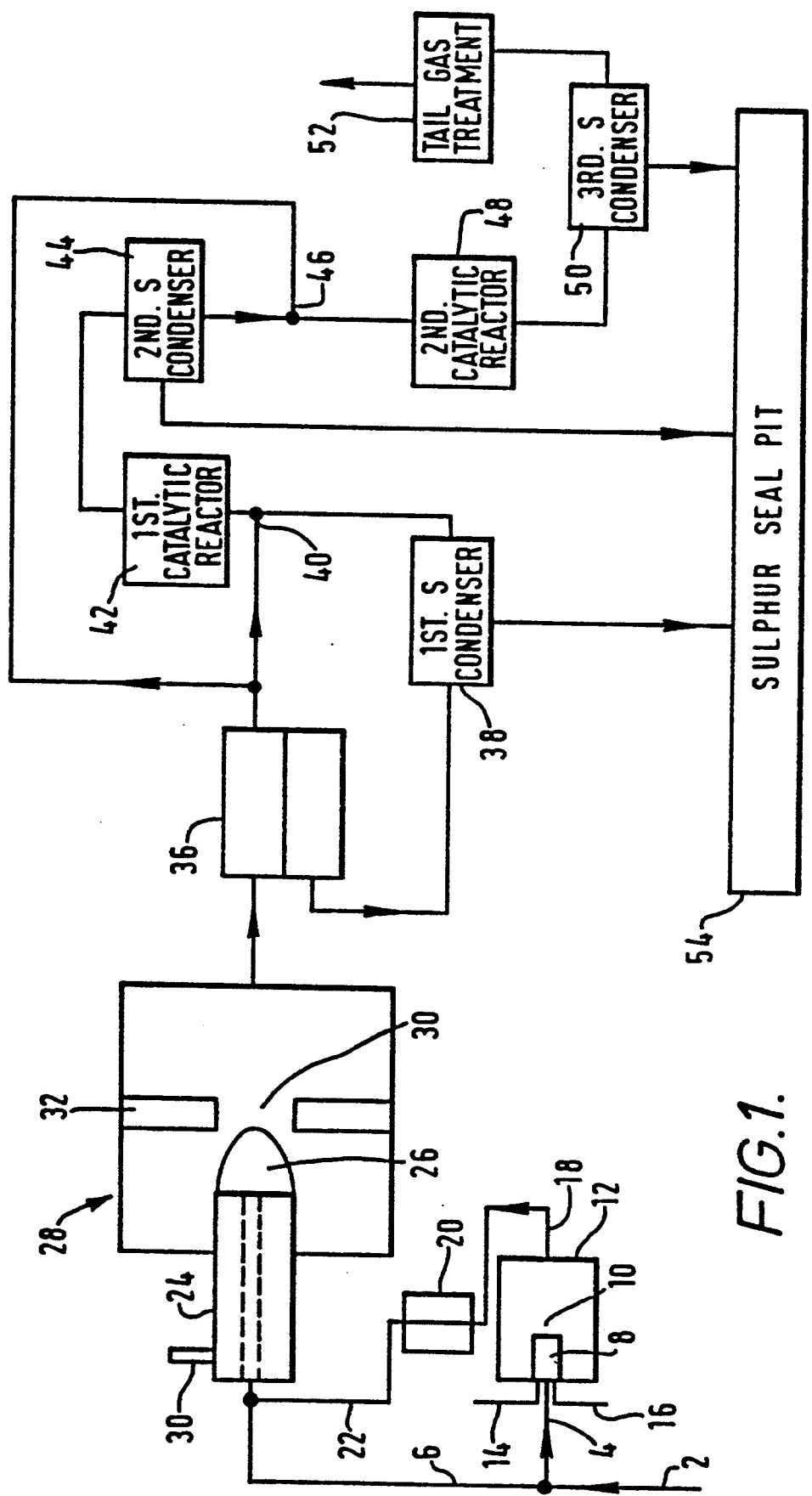
FIG. 1 is a schematic diagram illustrating one plant performing the method according to the invention.

Referring to FIG. 1 of the drawings, a conduit 2 communicates with a source (not shown) of hydrogen sulphide-rich gas mixture. Typically, the hydrogen sulphide-rich mixture includes at least 70% by volume of hydrogen sulphide. It may also include one or more other gases such as carbon dioxide, nitrogen, water vapour and hydrocarbons. The conduit 2 communicates with a first pipeline 4 for the flow of a minor stream of the hydrogen sulphide-rich gas and a second pipeline 6 for the flow of a major stream of the hydrogen sulphide-rich gas mixture. If desired, a blower (not shown) may be employed to assist the flow of the minor stream into the pipeline 4. In operation, typically in the order of 5 to 10% of the gas mixture flowing through the conduit 2 is introduced into the pipeline 4, and the balance into the pipeline 6. The pipeline 4 terminates in one inlet to a burner 8 that, in operation, fires into a first combustion region 10 defined within a small furnace 12. The burner 8 has a first additional inlet 14 for air (or other oxygen-containing gas mixture) and a second additional inlet 16 for liquid water (or other moderator). The furnace 12 has an outlet 18 communicating with one pass of a heat exchanger 20, in which in operation the gas mixture passing out of the furnace 12 is cooled. The resulting cooled gas mixture then passes along a pipeline 22 and is reunited with the major stream of hydrogen sulphide passing through the pipeline 6 at a region immediately upstream of its inlet into a second burner 24 that fires into a second or main furnace 28 defining a combustion region 26 therein.

Typically, in operation of the plant shown in the drawing, the rate at which air or oxygen is supplied to the burner 6 is sufficient for from 90 to 100% of the hydrogen sulphide content of the minor stream to be oxidised to sulphur dioxide in the combustion region 10. If desired, the oxygen pressure may be used to induce the flow of the minor stream into the pipeline 4. The rate at which liquid water or other moderator or quenchant is supplied to the combustion region 10 through the inlet 16 of burner 8 is dependent upon the maximum temperature that can be tolerated at the inlet to the heat exchanger 20. Typically, this maximum temperature may be in the order of 1250° C. The rate at which liquid water (or other moderator) is supplied to the inlet 16 is thus chosen in accordance with the rate at which hydrogen sulphide is supplied to the burner 8 and with the concentration of any other gases in the hydrogen sulphide stream entering the burner 8 such that the aforesaid maximum temperature does not exceed 1250° C. or other chosen maximum temperature.

Downstream of its exit from the furnace 12 the minor stream is preferably cooled to a temperature in the order of 300° C., that is a temperature above the dew point of the various components of the mixture. In the event that not all the hydrogen sulphide content of the minor stream is oxidised to sulphur dioxide, some of the residual hydrogen sulphide will tend to react with the sulphur dioxide in the furnace 12. Any such sulphur vapour will remain in the vapour state during its passage through the heat exchanger 20.

The combustion region 26 into which the burner 24 fires is defined by a second or main furnace 28. The burner 24 is fitted at the upstream end of the furnace 28 and has an inlet 30 for oxygen-rich gas in addition to its inlet for the major stream of hydrogen sulphide (to which the cooled minor stream is returned from the heat exchanger 20). The oxygen-rich gas is preferably pure oxygen. The relative rates of supply of the hydrogen sulphide-containing gas stream and the oxygen stream to the burner 24 are such that, in total, the burners 8 and 24 achieve the necessary combustion of the stoichiometric amount of hydrogen sulphide for complete conversion of the incoming hydrogen sulphide to sulphur. Since preferably substantially all the minor stream of hydrogen sulphide-containing gas is burned in the burner 24, significantly less than one third of the hydrogen sulphide content of the major gas stream supplied to the burner 24 from the pipeline 6 is combusted in order to achieve combustion of just one-third of the total content of hydrogen sulphide entering the conduit 2. The mixing of the major stream with the cooled gas stream from the heat exchanger 20, and the effect of the portion of the hydrogen sulphide that is not burnt, are capable of preventing an excessive temperature being created in the combustion region 26. The relative flow rates of the hydrogen sulphide-containing gas through the pipelines 4 and 6 are selected such that even in the event of the use of pure oxygen to support combustion of the hydrogen sulphide content of the major stream, an excessive temperature is not created within the furnace 28. Within these confines, however, the proportion of the gas mixture entering the conduit 2 which is diverted to the pipeline 4 for combustion in the burner 8 is preferably kept as small as possible. Typically, in the event that the feed gas mixture contains from 75 to 100% by volume of hydrogen sulphide; the proportion of the feed gas mixture that is diverted to the pipeline 4 is in the range 5 to 10% by volume, and at 90% hydrogen sulphide is in the order of 8.5% by volume.

The furnace 28 is in general substantially identical to a conventional Claus furnace. Accordingly, therefore, the furnace 28 has a suitable refractory lining (not shown) and a volume sufficient for there to be an adequate thermal reaction zone in association with the combustion region 26. The reaction between hydrogen sulphide and sulphur dioxide is typically initiated in the combustion region 26 and continues in the thermal reaction region 30. If desired, the furnace 28 may be provided with baffles or means 32 in order to facilitate mixing of the gases within the thermal reaction region 30. The thermal reaction between hydrogen sulphide and sulphur dioxide is endothermic above about 600° C., so some temperature drop takes place in the thermal reaction region 30 where the temperature is typically in the range 1350° C. to 1450° C. The effluent gases are then cooled in a waste heat boiler or heat exchanger 36 to a temperature, say, in the range 275° to 325° C.

The heat exchanger or waste heat boiler 36 has, as shown, two passes for the effluent gases from the furnace 28. A major portion of the effluent gases flows through both passes and is thus cooled to said temperature in the range 275° to 325° C. A minor portion of said gases flows through only the first pass and leaves the waste heat boiler 36 at a higher temperature, in the range 590° to 600° C., and is used as is described below. The major portion of the effluent gases then enters a first sulphur condenser 38 in which sulphur vapour formed by the reaction between sulphur dioxide and hydrogen sulphide is condensed out of the gas stream leaving the furnace 28. This condensation is effected by cooling the gas stream to a temperature in the order of 140° C. The sulphur condensate is then passed to a sulphur seal pit 54. The gas mixture exiting from the condenser 38 typically comprises hydrogen sulphide, sulphur dioxide, water vapour, nitrogen (resulting, for example, from the supply of air to the burner 8) and carbon dioxide together with traces of other gases. This gas mixture is reheated at 40 to a temperature in the range 220° to 250° C., by being mixed with a first stream taken from said minor portion of the effluent gases. The reheated gas mixture is then passed through a first catalytic reactor 42 in which reaction takes place between residual hydrogen sulphide and sulphur dioxide to form further sulphur vapour and water vapour. This reaction takes places over a catalyst which is typically of a conventional kind, for example, an activated alumina. Since the catalytic reaction between hydrogen sulphide and sulphur dioxide at these lower temperatures is exothermic, there is a rise in the temperature in the first catalytic reactor 42 and accordingly the gas mixture leaving this reactor 42 will typically have a temperature in the order of 300° to 350° C. If desired, the outlet temperature of the reactor 42 may be arranged to be higher, say in the range 350° to 400° C. Such a higher outlet temperature will tend to give improved hydrolysis of any carbon oxysulphide and carbon disulphide present in the gas mixture entering the reactor 42.

From the catalytic reactor 42, the gas mixture passes through a second sulphur condenser 44 in which sulphur is condensed out of the gas mixture. The resultant sulphur condensate is passed to the sulphur seal pit 54. Downstream of the sulphur condenser 44, the gas mixture is reheated at 46 from a temperature of, say, 140° C. to a temperature in the range, say, of 200° to 220° C. by mixing with a second part of said minor portion of effluent gases from the waste heat boiler 36, said temperature being typically slightly less than the inlet temperature to the first catalytic reactor 42. The gas stream then passes through a second catalytic reactor 48 where further reaction takes place between residual hydrogen sulphide and residual sulphur dioxide to form water vapour and sulphur vapour with the evolution of heat such that the temperature of the gas mixture is typically raised in the order of 50° C. as it passes from the inlet to the outlet of the catalytic reactor 48. The catalyst employed in the second catalytic reactor 48 is typically the same as that employed in the first catalytic reactor 42.

After leaving the second catalytic reactor 48, the gas mixture passes through a third sulphur condenser 50 in which sulphur is condensed out of the gas stream. The sulphur condensate is passed to the sulphur seal pit 54. The gas stream leaves the third sulphur condenser 50 as a tail gas stream at a temperature in the order of 140° C. and then enters the tail gas clean-up plant 52. The tail gas clean-up plant 52 may be of a conventional kind.

Typically, the furnaces shown in the drawing are operated at a pressure a little above atmospheric pressure. For example, the pressure in the furnaces may be in the range 1.5 to 2 atmospheres absolute.

Typically, all the plant shown in FIG. 1 of the drawings save for the burner 8, first furnace 10, heat exchange 20 and associated pipelines may be an existing plant for recovering sulphur from a hydrogen sulphide containing gas stream by the Claus process in normal operation of such plant, rather than supplying pure oxygen to support combustion of the hydrogen sulphide in the combustion region 26, air, unenriched in oxygen, is used for this purpose. Since about one-third of the hydrogen sulphide is burnt in such normal operation, approximately 14 volumes of air, and hence 11 volumes of nitrogen, are employed for each 6 volumes of hydrogen sulphide. Thus, a considerable part of the capacity of the plant is taken up in conveying nitrogen and not sulphur-containing gases. Substituting pure oxygen for the air, (and, if necessary, making modifications to the burner 24) and adding the pipeline 4, burner 8, furnace 12, heat exchanger 20 and pipeline 22 to the rest of the plant, makes it possible for the plant to be operated in accordance with the present invention while substantially reducing the mass flow rate of nitrogen through the plant. Moreover, since the total number of moles of water introduced into the burner will typically be a small fraction of the total number of moles of nitrogen contained in the combustion air in conventional operation of the plant, the plant may by operation in accordance with the invention be considerably uprated.

The method according to the invention is further illustrated by the following example in which a plant similar to that shown in FIG. 1 is used, but with reheat of the gas stream immediately upstream of each catalytic reactor being effected by indirect heat exchange rather than by mixing the gas stream with gas by-passed from an intermediate region of the waste heat boiler 36 (as shown in FIG. 1).

A gas stream comprising 90% by volume of hydrogen sulphide and 10% by volume of carbon dioxide is treated at a rate of 100 Kmole per hour. A minor portion of the gas stream is passed at a rate of 8.5 Kmole per hour into a first combustion region and all of its hydrogen sulphide content is burnt to form sulphur dioxide and water vapour. Pure oxygen is passed into the first combustion region at a rate of about 11.5 Kmole per hour in order to support combustion of the hydrogen sulphide. In order to maintain the maximum flame temperature at about 1250° C., water is introduced in atomised state into the flame at a rate of 27 Kmole per hour. The combustion products comprising 80% by volume of water vapour, 18% by volume of sulphur dioxide and 2% by volume of carbon dioxide are passed at a rate of 43 Kmole per hour through a heat exchanger to reduce their temperature to 300° C. The resulting cooled gas mixture is then mixed with the remainder of the gaseous mixture of hydrogen sulphide and carbon dioxide. This mixture is then passed into a second combustion region forming part of a furnace in which hydrogen sulphide is oxidised with oxygen to sulphur dioxide such that the resulting gas contains hydrogen sulphide and sulphur dioxide in the ratio of 2 to 1. In addition sulphur dioxide reacts in the furnace with hydrogen sulphide to form water vapour and sulphur vapour.

A resultant gas mixture comprising sulphur vapour, water vapour, hydrogen sulphide, sulphur dioxide, carbon dioxide, and small amounts of hydrogen, carbon monoxide and carbon oxysulphide (which are formed as a result of side reactions) leaves the furnace at a temperature of about 1423° C. and is reduced in temperature to about 316° C. in a waste heat boiler. The gas mixture leaving the waste heat boiler is passed through a sulphur condenser in which sulphur is condensed and the condensate is extracted from the gas mixture. After the extraction of the sulphur vapour the gas mixture has the following composition by volume: sulphur dioxide 6.7%; hydrogen sulphide 12.75%; water vapour 70%; carbon dioxide 6.2%; hydrogen 3.2%; carbon monoxide 0.6%; carbon oxysulphide 0.55%.

There are typically two conventional stages of catalytic conversion to achieve further reaction between hydrogen sulphide and sulphur dioxide. Upstream of the first such stage the gas mixture from the sulphur condenser is reheated to about 233° C. It leaves the first stage at a temperature of 343.5° C. After condensation and extraction of the thus formed sulphur vapour, the gas mixture is reheated to about 215.5° C. and is then passed through the second catalytic conversion stage, in which its temperature rises to about 261° C. The resultant gas mixture has sulphur vapour condensed and extracted therefrom and is then subjected to a conventional tail gas treatment to remove most of the hydrogen sulphide that remains in the gas mixture after the second catalytic stage.

A modification to the plant shown in FIG. 1 is now described with reference to FIG. 2. In this modification the first burner 8 is not supplied with water and hence the inlet 16 is omitted. In its place a gas recycle is provided by means of a blower 60 disposed in a conduit 62 which terminates at its inlet in the conduit 22 downstream of the heat exchanger 20 and at its outlet in the conduit 4. In operation, the rate of recycle is chosen to maintain the flame temperature in the region 10 at a chosen value in the range 1200° to 1400° C. In one example of the use of the modified plant shown in FIG. 2, a feed gas stream comprising 90% by volume of hydrogen sulphide and 10% by volume of sulphur dioxide is passed into the pipeline 2. 12% of the stream is diverted into the pipe 4. The hydrogen sulphide content of the gas mixture flowing through the pipe 4 is burnt to sulphur dioxide and water vapour in the combustion region 12 of the cooling of the resulting combustion products in the heat exchanger 20, a sufficient portion of the cooled gas mixture is recirculated to the combustion region 12 to maintain the temperature therein at a suitable level. The remainder of the cooled gas mixture is then mixed with the remainder of the feed gas stream in the conduit 6.

Figure 2:
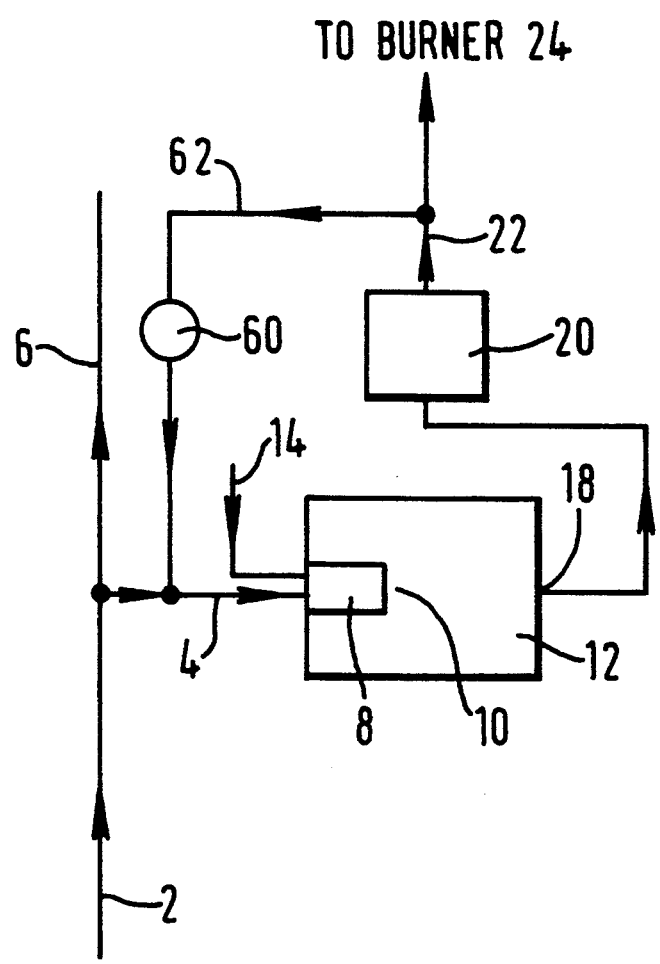
FIG. 2 is a schematic diagram illustrating a modification to the plant shown in FIG. 1.

A further example of the use of the modified plant shown in FIG. 2 is given below. In this example, reheat of the gas upstream of each catalytic reactor is effected by indirect heat exchange.

A gas stream comprising 90% by volume of hydrogen sulphide and 10% by volume of carbon dioxide is treated at a rate of 100 Kmole per hour. A minor portion of the gas stream is passed at a rate of 11.5 Kmole per hour into a first combustion region and all of its hydrogen sulphide content is burnt to form sulphur dioxide and water vapour. Pure oxygen is passed into the first combustion region at a rate of about 15.5 Kmole per hour in order to support combustion of the hydrogen sulphide. In order to maintain the maximum flame temperature at about 1250° C., a stream of moderating gas (whose formation is described below) is introduced into the flame at a rate of 71.5 Kmole per hour. The combustion products comprising 47.4% by volume of water vapour, 47.4% by volume of sulphur dioxide and 5.2% by volume of carbon dioxide are passed at a rate of 93.35 Kmole per hour through a heat exchanger to reduce their temperature to 300° C. The resulting cooled gas mixture is then divided into two parts. One part (71.5 Kmole/hr) is used as the moderating gas and is thus returned to the first combustion region. The other part (21.85 Kmole/hr) is mixed with the remainder (88.5 Kmole/hr) of the gaseous mixture of hydrogen sulphide and carbon dioxide. This mixture is then passed into a second combustion region forming part of a furnace in which hydrogen sulphide is oxidised with oxygen to sulphur dioxide such that the resulting gas contains hydrogen sulphide and sulphur dioxide in the ratio of 2 to 1. In addition sulphur dioxide reacts in the furnace with hydrogen sulphide to form water vapour and sulphur vapour.

A resultant gas mixture comprising sulphur vapour, water vapour, hydrogen sulphide, sulphur dioxide, carbon dioxide, and small amounts of hydrogen, carbon monoxide and carbon oxysulphide (which are formed as a result of side reactions) leaves the furnace at a temperature of about 1423° C. and is reduced in temperature to about 316° C. in a waste heat boiler. The gas mixture leaving the waste heat boiler is passed through a sulphur condenser in which sulphur is condensed and the condensate is extracted from the gas mixture. After the extraction of the sulphur vapour the gas mixture has the following composition by volume: sulphur dioxide 8.6%; hydrogen sulphide 16.65%; water vapour 61.6%; carbon dioxide 7.95%; hydrogen 4.0%; carbon monoxide 0.67%; carbon oxysulphide 0.50%.

There are typically two conventional stages of catalytic conversion to achieve further reaction between hydrogen sulphide and sulphur dioxide. Upstream of the first such stage the gas mixture from the sulphur condenser is reheated to about 232° C. It leaves the first stage at a temperature of about 369.5° C. After condensation and extraction of the thus formed sulphur vapour, the gas mixture is reheated to about 215.5° C. and is then passed through the second catalytic conversion stage, in which its temperature rises to about 275° C. The resultant gas mixture has sulphur vapour condensed and extracted therefrom and is then subjected to a conventional tail gas treatment to remove most of the hydrogen sulphide that remains in the gas mixture after the second catalytic stage.

I claim:

1. A method of recovering sulphur from a feed gas stream comprising hydrogen sulphide comprising: dividing the feed gas stream into a major stream and a minor stream; burning in a first combustion region at least 50% of the hydrogen sulphide content of the minor stream to form sulphur dioxide and water vapour; cooling said minor stream; introducing the cooled minor stream into a second combustion region, a thermal region associated therewith or both of said regions; burning in said second combustion region less than one-third of the hydrogen sulphide content in the major stream to form sulphur dioxide and water vapour, wherein the combustion in both of said first and second combustion region is supported by supplying oxygen-rich gas thereto and a fluid is introduced into the first combustion zone to moderate the temperature therein; reacting hydrogen sulphide with the thus-formed sulphur dioxide in said thermal region to form sulphur vapour and water vapour; extracting said sulphur vapour from the resulting gas mixture; reacting residual hydrogen sulphide in the gas mixture with residual sulphur dioxide to form further sulphur vapour and water vapour, and extracting said further sulphur vapour; wherein about one-third of the total hydrogen sulphide content of the major and minor streams is combusted to form sulphur dioxide and water vapour.

2. A method in accordance with claim 1, wherein substantially all of the hydrogen sulphide content of said minor stream is combusted in the first combustion region.

3. A method according to claim 1, wherein the oxygen-rich gas supplied to said combustion regions is substantially pure oxygen.

4. A method according to claim 1, wherein the feed gas contains at least 60% by volume of hydrogen sulphide.

5. A method according to claim 1, wherein the cooled minor stream is introduced into at least one flame in the second combustion region.

6. A method according to claim 1, wherein the cooled minor stream is mixed with the major stream upstream of the second combustion region.

7. A method according to claim 1, wherein said fluid is selected from the group consisting of steam, liquid water, nitrogen and carbon dioxide and said minor stream comprises up to about 10% by volume of the feed gas stream.

8. A method according to claim 1, wherein said fluid is a portion of the cooled minor stream and said minor stream comprises from about 8% to about 15% by volume of the feed gas stream.

* * * * *